United States Patent Office 3,415,756
Patented Dec. 10, 1968

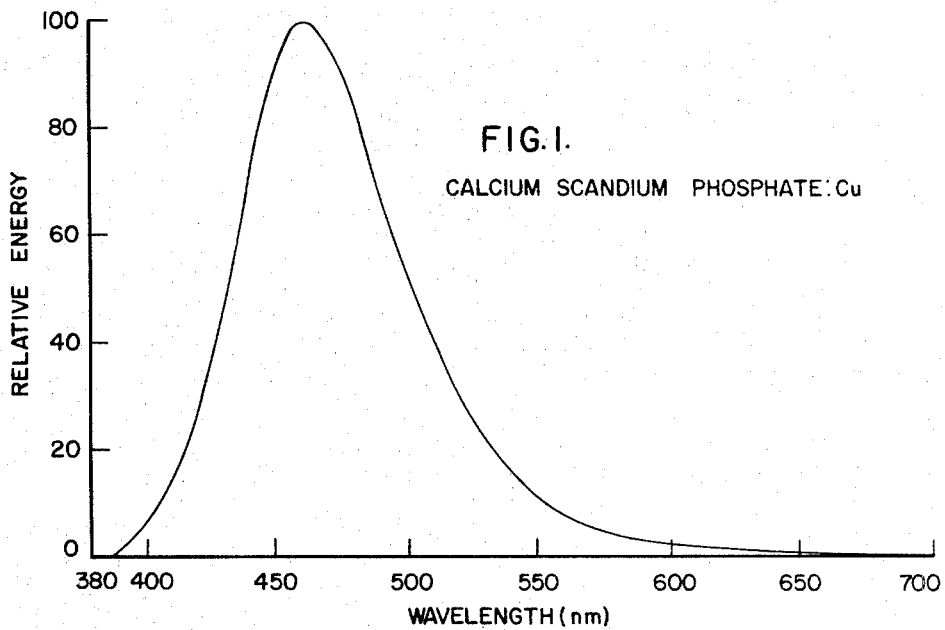
FIG. I.
CALCIUM SCANDIUM PHOSPHATE:Cu
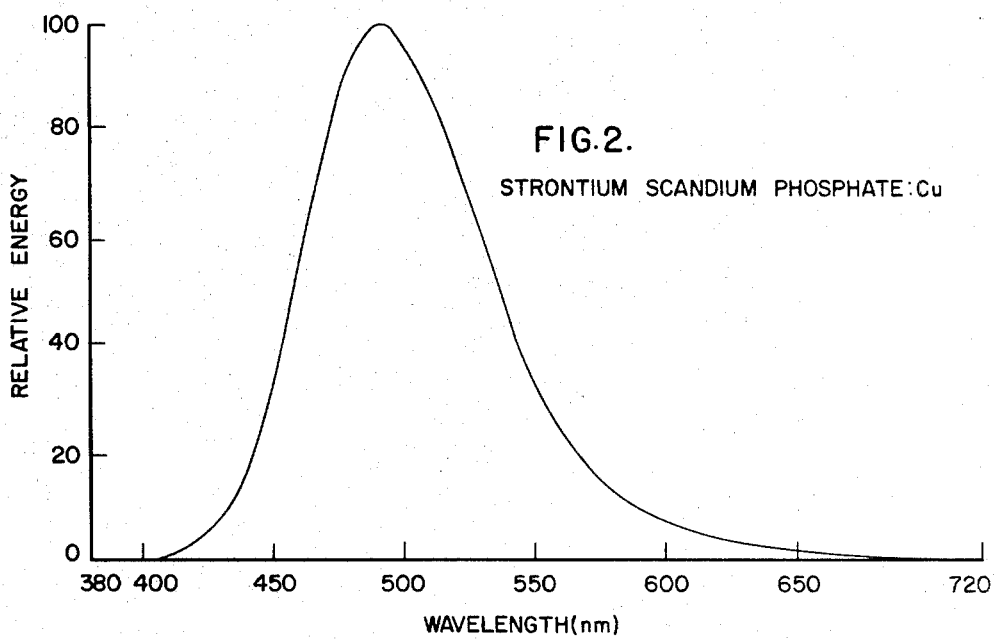
FIG. 2.
STRONTIUM SCANDIUM PHOSPHATE:Cu

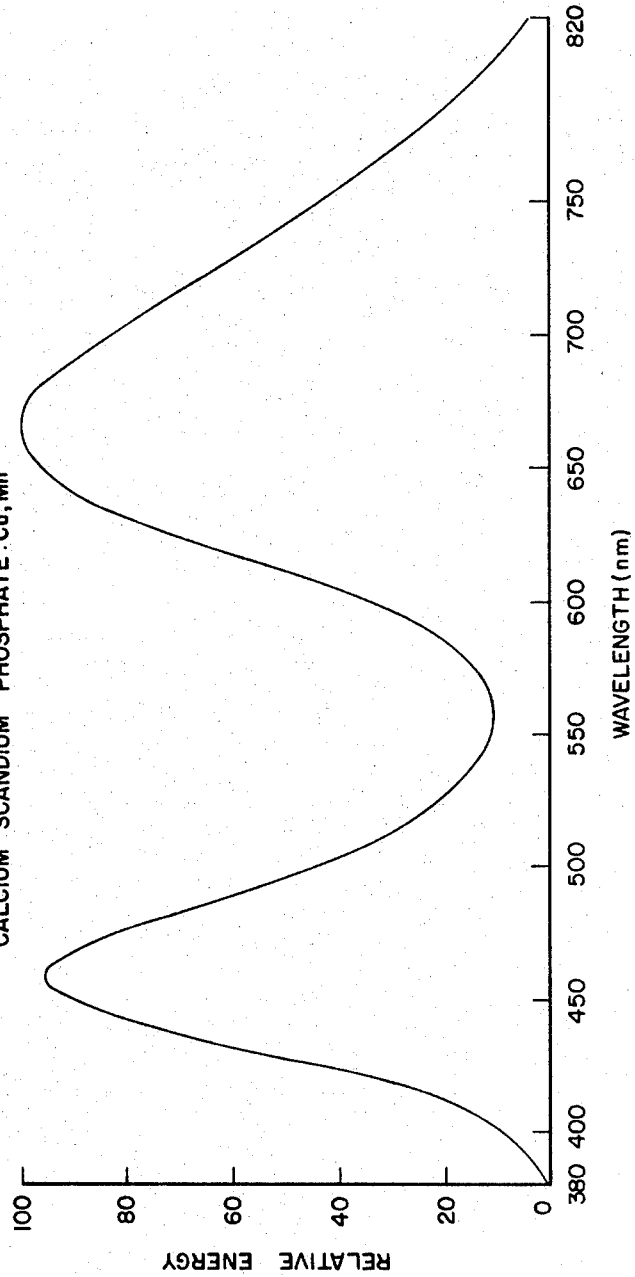

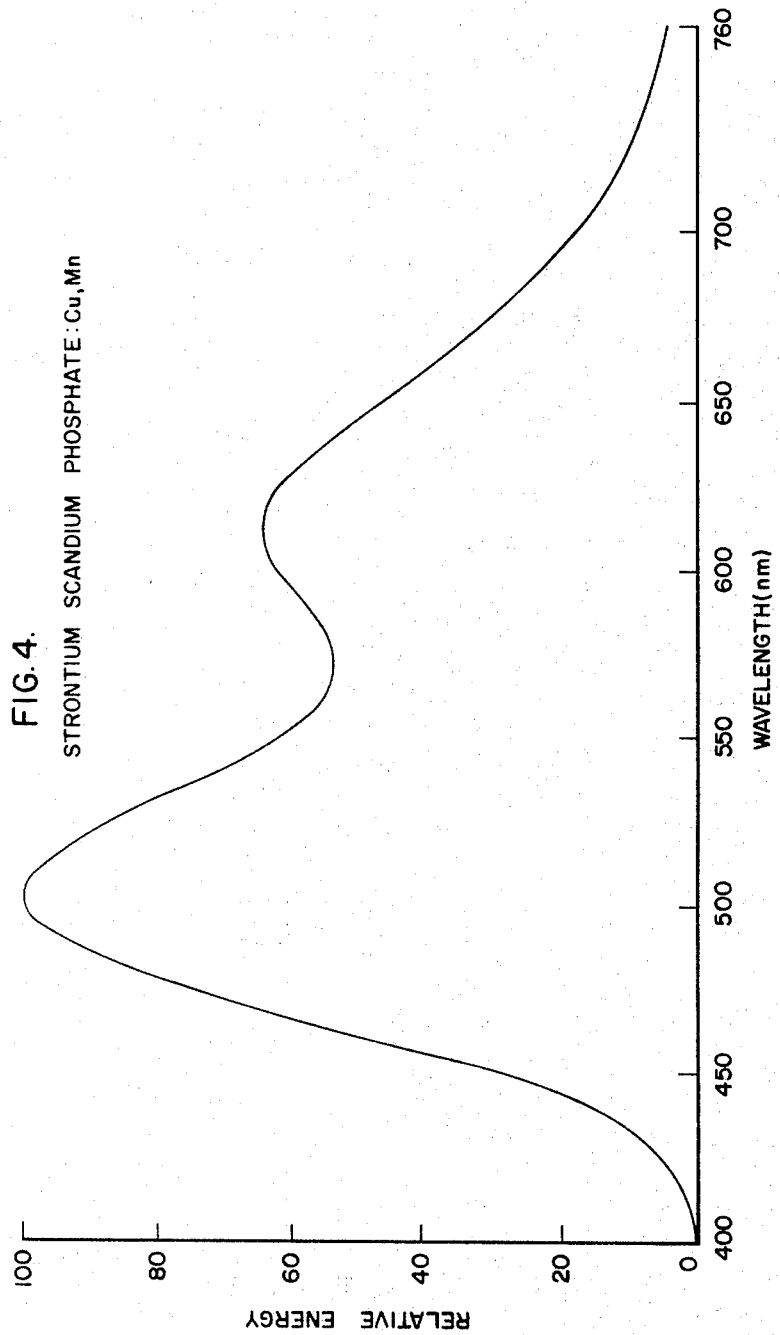

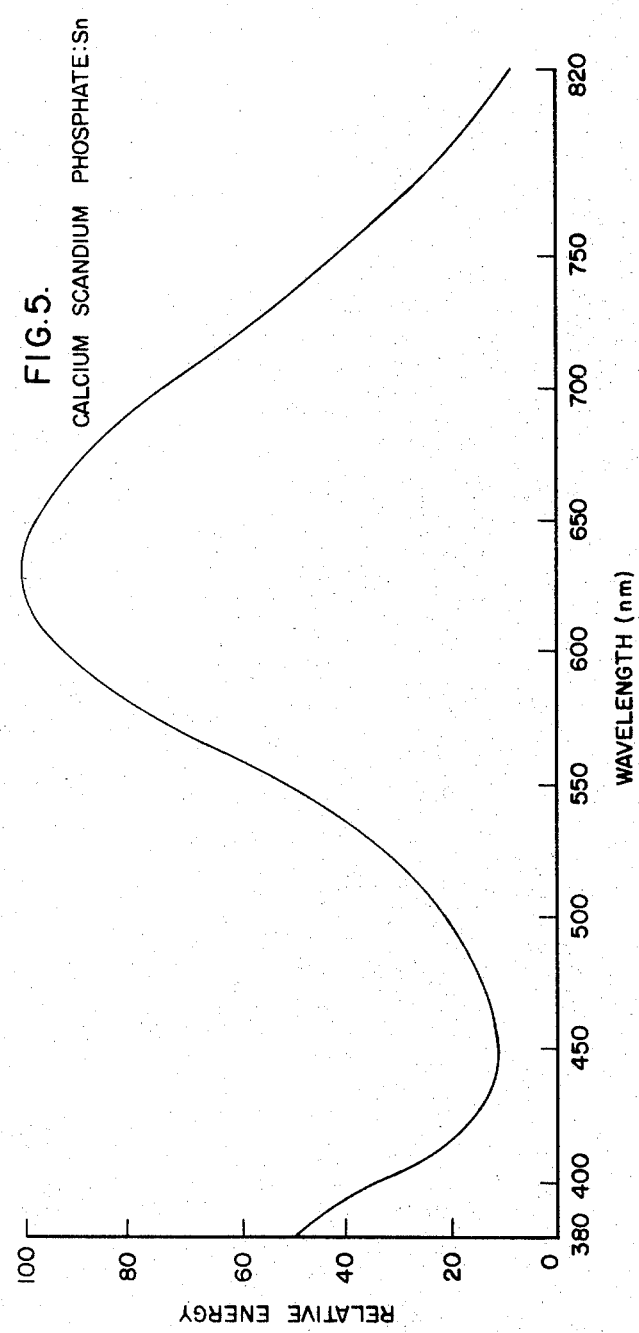

3,415,756
SCANDIUM-CONTAINING ALKALINE EARTH PHOSPHATE PHOSPHOR HAVING GOOD TEMPERATURE-DEPENDENCE CHARACTERISTICS
Henry W. Rimbach, Cedar Grove, N.J., assignor to Westinghouse Electric Corporation, Pittsburgh, Pa., a corporation of Pennsylvania
Filed June 28, 1965, Ser. No. 467,243
7 Claims. (Cl. 252—301.4)

ABSTRACT OF THE DISCLOSURE

Phosphor composition is strontium phosphate or calcium phosphate plus scandium phosphate activated by copper or tin, with or without manganese. Phosphor has good temperature-dependence characteristics and its emission color under ultra-violet excitation can be varied over a wide range by selection of activators.

---

This invention relates to phosphor material and, more particularly, to phosphor material which has particular use in conjunction with discharge devices.

Inorganic phosphor materials have particular utility with discharge devices such as fluorescent lamps or high-pressure, mercury-vapor (HPMV) lamps. In the case of a fluorescent lamp, the phosphor material is coated onto the inner surface of the tube and is excited by the 2537 A.U. radiations of the mercury discharge to generate visible light. In the case of an HPMV lamp, the phosphor material is normally coated onto the inner surface of the surrounding envelope and converts the ultraviolet radiations which are emanated by the high-pressure discharge into visible light in order to augment the light output of the high-pressure mercury arc and to color correct same. For such use with an HPMV lamp, the phosphor should have good temperature-dependence characteristics in that it should function efficiently to convert ultraviolet radiations into visible radiations when the phosphor temperature is relatively high, such as 200 to 300° C. For both fluorescent lamp and HPMV lamp applications, it is desirable to be able to vary the color of the lamps through a wide range in order to obtain different color effects and these different color effects can be obtained either by using a single phosphor or by blending different phosphors.

It is the general object of this invention to provide phosphor material which efficiently converts ultraviolet radiations into visible radiations and which phosphor can be compounded to produce different emissions of a wide range of colors.

It is a further object to provide phosphor material which efficiently converts ultraviolet radiations into visible radiations under high-temperature conditions, and which phosphor material can be compounded to achieve different output colors.

The aforesaid objects of the invention, and other objects which will become apparent as the description proceeds, are achieved by providing a phosphate phosphor material which has as essential metallic elements scandium, strontium or calcium or mixtures thereof, and copper or tin or mixtures of copper and tin which serve as activator. A manganese additional activator can be used if desired. There are also provided relative composition proportions for the essential elements of the phosphor.

For a better understanding of the present invention, reference should be had to the accompanying drawings, wherein:

FIGURE 1 is a graph of relative energy versus wavelength showing the emission of tin-activated calcium-calcium-scandium phosphate phosphor;

FIG. 2 is a graph or relative energy versus wavelength showing the spectral emission of copper-activated strontium-scandium phosphate phosphor;

FIG. 3 is a graph of relative energy versus wavelength showing the spectral emission of copper- and manganese-activated calcium-scandium phosphor;

FIG. 4 is a graph of relative energy versus wavelength showing the emission of copper- and manganese-activated strontium-scandium phosphate phosphor; and FIG. 5 is a graph of relative energy versus wavelength showing the emission of tin-activated calcium-scandium phosphate phosphor.

Following are specific examples for preparing phosphor of the present invention:

EXAMPLE I

To prepare a copper-activated calcium-scandium phosphate phosphor, 2.69 moles calcium oxide and 0.67 mole scandium oxide ($Sc_2O_3$) are mixed with 1 mole of phosphorus pentoxide ($P_2O_5$) and 0.015 mole of copper, added as carbonate. In any of the examples as given herein, alkaline-earth metals and phosphate can be added as $CaHPO_4$ or $SrHPO_4$ and calcium carbonate or strontium carbonate. The raw-mix materials are thoroughly blended and fired at a temperature of 1325° C. in a slightly reducing atmosphere. An example of the firing atmosphere is an inert gas such as nitrogen which has from 1% to 4% by volume of hydrogen added thereto. This atmosphere apparently causes at least a part of the copper to be present in the phosphor in the cuprous state. The spectral emission response of the phosphor to 254 nm. excitation is shown in FIG. 1.

EXAMPLE II

To prepare a strontium-scandium phosphate activated by copper, an equivalent molar amount of strontium oxide is substituted for the calcium oxide in the preceding example. The firing conditions are otherwise identical and the spectral emission response to 254 nm. excitation is shown in FIG. 2.

EXAMPLE III

A calcium scandium phosphate phosphor which is activated by copper and manganese is prepared by mixing 2.635 moles calcium oxide, 0.0658 mole scandium oxide and 1.00 mole phosphorus pentoxide with 0.015 mole copper, added as copper carbonate, and 0.060 mole manganese added as manganous carbonate. The raw-mix is fired as in Example I and the spectral response of the phosphor to 254 nm. excitation is shown in FIG. 3. The manganese activator adds a red emission band to the emission and decreases the blue-green emission of the copper activator, with the greater the manganese addition, the stronger the long wavelength emission of the phosphor.

EXAMPLE IV

A strontium-scandium phosphate phosphor which is activated by copper and manganese is prepared by mixing 2.654 moles strontium oxide with 0.0663 mole scandium oxide, 1.00 mole phosphorus pentoxide, 0.015 mole copper, added as copper carbonate, and 0.040 mole manganese, added as manganous carbonate. The raw-mix materials are fired as in the first example and the spectral response of the phosphor to 254 nm. excitation is shown in FIG. 4. As can be seen from a comparison of FIGS. 3 and 4, when less manganeses activator is used, as in Example IV, the relative amount of the long wavelength emission is decreased, as compared to the shorter wavelength emission. When the manganese activator is used, the phosphor displays a pronounced red phosphorescence.

EXAMPLE V

In order to prepare a calcium- or strontium-scandium phosphate activated by tin, 2.706 moles of calcium oxide or strontium oxide are mixed with 0.0676 mole scandium oxide, 1.00 mole phosphorus pentoxide and 0.040 mole of tin, added as stannous oxide. The raw-mix is then fired as specified in the foregoing Example I. The resulting phosphor is quite reddish in appearance and the emission of the inactivated calcium-scandium phosphate phosphor under 254 nm. excitation is shown in FIG. 5. The emission of the tin-activated strontium-scandium phosphate phosphor is quite similar to the emission of the corresponding tin-activated calcium-scandium phosphate phosphor.

The tin-activated phosphor embodiments can be modified to incorporate an additional manganese activator. As an example, a tin and manganese activated material is prepared by adding 0.040 mole of manganese as manganous carbonate to the raw-mix as given in Example V.

As an alternative embodiment, the strontium and calcium oxides can be mixed in any proportions in preparing the phosphor, in order to provide a mixed strontium-calcium scandium phosphate matrix. This matrix can be activated by copper or tin or a mixture thereof, with or without manganese.

In the foregoing phosphors, the essential metallic elements are scandium, strontium or calcium or mixtures thereof, and copper or tin or mixtures thereof. In this phosphor, the atom ratio of the total activator to phosphorus can vary between 0.001:2 and 0.1:2, with the atom ratio of copper to phosphorus in the phosphor being less than 0.06:2. The atom ratio of total metal to phosphorus in the phosphor can vary from 2.4:2 to 3.0:2 and the atom ratio of scandium to the alkaline-earth metal in the phosphor can vary from 1:5 to 1:100. Preferably, the atom ratio of total copper and tin activator to phosphorus in the phosphor is between 0.005:2 and 0.06:2, the atom ratio of total metal to phosphorus in the phosphor is from 2.6:2 to 2.9:2, and the atom ratio of scandium to alkaline-earth metal in the phosphor is from 1:10 to 1:40. The present phosphor can be modified with respect to emission by adding manganese to the raw-mix in such amount that the atom ratio of manganese to phosphorus in the fired phosphor material is from 0.0005:2 to 0.15:2. While less than the minimum specified amount of manganese can be used, its effect in such small quantities will be minimal.

Because of the firing conditions which are used, at least a part of the activator will be present in its lower valence state. For example, at least a part of the copper will be present in the cuprous state, at least a part of the tin will be in the stannous state and at least a part of the manganese will be in the manganous state.

The phosphor of the present invention has very good temperature-dependence characteristics and its output remains very good even at elevated temperatures such as 220° C. This makes the phosphor useful for applications such as HPMV lamps, although the phosphor can be used equally well with fluorescent lamps. It should also be understood that the phosphor can be used in any application where it is desired to convert ultraviolet radiations into visible radiations, such as a fluorescent sign.

It will be recognized that the objects of the invention have been achieved by providing an improved phosphor material wherein the spectral response of the phosphor can be varied over a wide range of wavelengths simply by varying the phosphor activators. In addition, the phosphor not only can be compounded to produce a wide range of colors but also displays very good temperature-dependence characteristics.

While best embodiments of the invention have been illustrated and described in detail, it is to be particularly understood that the invention is not limited thereto or thereby.

I claim as my invention:

1. A phosphate phosphor having as essential metallic elements scandium, at least one alkaline-earth metal of the group consisting of strontium and calcium, and at least one activator of the group consisting of copper and tin, the atom ratio of said activator to phosphorus in said phosphor being between 0.001:2 and 0.1:2 with the atom ratio of copper to phosphorus in said phosphor being less than 0.06:2, the atom ratio of total metal to phosphorus in said phosphor being from 2.4:2 to 3.0:2, the atom ratio of scandium to said alkaline-earth metal in said phosphor being from 1:5 to 1:100, and said activators being at least in part in the cuprous state and the stannous state.

2. The phosphate phosphor as specified in claim 1, wherein manganese activator at least a portion of which is in the divalent state is also included in such amount that the atom ratio of manganese to phosphorus in said phosphor is from 0.005:2 to 0.15:2.

3. A calcium-scandium phosphate phosphor activated by copper, the atom ratio of copper to phosphorus in said phosphor being between 0.001:2 and 0.06:2, the atom ratio of total metal to phosphorus in said phosphor being from 2.4:2 to 3.0:2, the atom ratio of scandium to calcium in said phosphor being from 1:5 to 1:100, and said copper activator being at least in part in the cuprous state.

4. The phosphate phosphor as specified in claim 3, wherein manganese activator at least a portion of which is in the divalent state is also included in such amount that the atom ratio of manganese to phosphorus in said phosphor is from 0.0005:2 to 0.15:2.

5. A strontium-scandium phosphate phosphor activated by copper, the atom ratio of copper to phosphorus in said phosphor being between 0.001:2 and 0.06:2, the atom ratio of total metal to phosphorus in said phosphor being from 2.4:2 to 3.0:2, the atom ratio of scandium to strontium in said phosphor being from 1:5 to 1:100, and said copper activator being at least in part in the cuprous state.

6. The phosphate phosphor as specified in claim 5, wherein manganese activator at least a portion of which is in the divalent state is also included in such amount that the atom ratio of manganese to phosphorus in said phosphor is from 0.0005:2 to 0.15:2.

7. A phosphate phosphor having as essential metallic elements scandium, at least one alkaline-earth metal of the group consisting of strontium and calcium, and at least one activator of the group consisting of copper and tin, the atom ratio of said activator to phosphorus in said phosphor being between 0.005:2 and 0.06:2, the atom rato of total metal to phosphorus in said phosphor being from 2.6:2 to 2.9:2, the atom ratio of scandium to said alkaline-earth metal in said phosphor being from 1:10 to 1:40, and said activators being at least in part in the cuprous state and the stannous state.

References Cited

UNITED STATES PATENTS 3,025,423  3/1962  Rimbach _____ 252—301.4
3,328,620  6/1967  Rimbach _____ 252—301.4

TOBIAS E. LEVOW, *Primary Examiner.*

ROBERT D. EDMONDS, *Assistant Examiner.*